US011830273B2

(12) United States Patent
Yang

(10) Patent No.: US 11,830,273 B2
(45) Date of Patent: Nov. 28, 2023

(54) MULTI-TARGET PEDESTRIAN TRACKING METHOD, MULTI-TARGET PEDESTRIAN TRACKING APPARATUS AND MULTI-TARGET PEDESTRIAN TRACKING DEVICE

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 351 days.

(21) Appl. No.: 17/280,821

(22) PCT Filed: Jul. 28, 2020

(86) PCT No.: PCT/CN2020/105196
§ 371 (c)(1),
(2) Date: Mar. 26, 2021

(87) PCT Pub. No.: WO2021/018141
PCT Pub. Date: Feb. 4, 2021

(65) Prior Publication Data
US 2022/0004747 A1    Jan. 6, 2022

(30) Foreign Application Priority Data
Jul. 31, 2019    (CN) .......................... 201910703259.5

(51) Int. Cl.
G06V 40/10    (2022.01)
G06V 10/25    (2022.01)
(Continued)

(52) U.S. Cl.
CPC .............. *G06V 40/10* (2022.01); *G06F 18/22* (2023.01); *G06V 10/25* (2022.01); *G06V 20/46* (2022.01); *G06V 2201/07* (2022.01)

(58) Field of Classification Search
CPC ........ G06V 40/10; G06V 10/25; G06V 20/46; G06V 2201/07; G06V 10/761; G06V 40/103; G06V 20/41; G06F 18/22
See application file for complete search history.

(56) References Cited

U.S. PATENT DOCUMENTS 10,963,893 B1 *   3/2021   Sharma ................. G06F 18/256
2010/0046798 A1 *   2/2010   Miyazaki ............. H04N 23/635
382/103

(Continued)

FOREIGN PATENT DOCUMENTS

CN    105844669 A    8/2016
CN    108022258 A    5/2018
(Continued)

OTHER PUBLICATIONS

First Office Action for Chinese Application No. 201910703259.5, dated May 27, 2021, 10 Pages.
(Continued)

*Primary Examiner* — Santiago Garcia
(74) *Attorney, Agent, or Firm* — BROOKS KUSHMAN P.C.

(57) ABSTRACT

A multi-target pedestrian tracking method, a multi-target pedestrian tracking apparatus and a multi-target pedestrian tracking device are provided, related to the field of image processing technologies. The multi-target pedestrian tracking method includes: detecting a plurality of candidate pedestrian detection boxes in a current frame of image to be detected, where a temporary tracking identification and a tracking counter are set for each of the plurality of candidate pedestrian detection boxes; and determining whether each of the plurality of candidate pedestrian detection boxes matches an existing tracking box, updating a value of the tracking counter according to a determination result, and continuing to detect a next frame of image to be detected.

(Continued)

When the value of the tracking counter reaches a first preset threshold, the updating the value of the tracking counter is stopped, and the temporary tracking identification is converted to a confirmed tracking identification.

15 Claims, 4 Drawing Sheets

(51) Int. Cl.
*G06V 20/40* (2022.01)
*G06F 18/22* (2023.01)

(56) References Cited

U.S. PATENT DOCUMENTS

| | | | | |
|---|---|---|---|---|
| 2010/0097484 | A1* | 4/2010 | Yata | H04N 23/61 |
| | | | | 348/222.1 |
| 2018/0046865 | A1* | 2/2018 | Chen | G06T 7/20 |
| 2019/0325243 | A1* | 10/2019 | Sikka | G06V 10/267 |
| 2020/0160048 | A1* | 5/2020 | Wang | G06N 3/045 |
| 2020/0226523 | A1* | 7/2020 | Xu | G06V 40/103 |
| 2020/0257940 | A1* | 8/2020 | Leung | G06F 18/22 |
| 2022/0254161 | A1* | 8/2022 | Tatrai | G08B 31/00 |
| 2023/0036905 | A1* | 2/2023 | Xu | G06V 10/267 |

FOREIGN PATENT DOCUMENTS

| | | |
|---|---|---|
| CN | 108053427 A | 5/2018 |
| CN | 108734107 A | 11/2018 |
| CN | 109063593 A | 12/2018 |
| CN | 110414447 A | 11/2019 |

OTHER PUBLICATIONS

International Search Report and Written Opinion for Application No. PCT/CN2020/105196 dated Oct. 28, 2020, 9 Pages.
Pprp, "Deep SORT (Non official translation: Code Analysis of Deep SORT, (a Multi-Object Tracking Algorithm)," CnBlogs, [online], [search date: Oct. 14, 2020], searched on internet: <URL:https://www.cnblogs.com/pprp/articles/12736831.html>, Apr. 20, 2020, 37 Pages.
Gagnon et al., "A System for Tracking and Recognizing Pedestrian Faces Using a Network of Loosely Coupled Cameras," Proceedings of The International Society for Optical Engineering (SPIE), Dec. 31, 2006, 9 Pages.
Luhong et al., "An Algorithm for Tracking Faces Based on Face Detection," Computer Engineering and Application, Dec. 31, 2001, pp. 42-45, Article No. 1002-8331-QQQ1)17-0042-04 Document identification code A CLC No. TP391.4, Computer Science and Technology Department, Tsinghua University, Beijing, China (4 Pages).
Cdknight_happy. "DeepSort (Non-official translation: Study on DeepSort)" CSDN, [online], [search date: Oct. 14, 2020], searched on internet: <URL:https://blog.csdn.netlcdknight_happy/article/details/79731981>, Mar. 31, 2018, 8 Pages.
Wojke, Nicolai et al., "Simple Online and Realtime Tracking With a Deep Association Metric," URL: <https://arxiv.org/abs/1703.07402>, Mar. 21, 2017, sections 1-4, 5 Pages.

* cited by examiner

MULTI-TARGET PEDESTRIAN TRACKING METHOD, MULTI-TARGET PEDESTRIAN TRACKING APPARATUS AND MULTI-TARGET PEDESTRIAN TRACKING DEVICE

CROSS-REFERENCE TO RELATED APPLICATIONS

This application is the U.S. national phase of PCT Application No. PCT/CN2020/105196 filed on Jul. 28, 2020, which claims priority to Chinese Patent Application No. 201910703259.5 filed on Jul. 31, 2019, which are incorporated herein by reference in their entireties.

TECHNICAL FIELD

The present disclosure relates to the field of image processing technologies, in particular to a pedestrian tracking method, a pedestrian tracking apparatus and a pedestrian tracking device.

BACKGROUND

Target tracking, such as pedestrian tracking, is an important aspect of computer vision technologies, and has broad application prospects in artificial intelligence (AI), video surveillance, human-computer interaction, robotics, and military guidance, etc.

A multi-target tracking algorithm in the related art is mainly based on a tracking-by-detection mode, which achieves the effect of multi-target tracking by associating a pedestrian detected in adjacent video frames. However, due to a large number of blockings and crossings between pedestrians, problems of pedestrian tracking missing and mismatching are prone to occur.

SUMMARY

A multi-target pedestrian tracking method is provided in an embodiment of the present disclosure, including: detecting a plurality of candidate pedestrian detection boxes in a current frame of image to be detected, where a temporary tracking identification and a tracking counter are set for each of the plurality of candidate pedestrian detection boxes; and determining whether each of the plurality of candidate pedestrian detection boxes matches an existing tracking box, updating a value of the tracking counter according to a determination result, and continuing to detect a next frame of image to be detected. In a case that the value of the tracking counter reaches a first preset threshold, the updating the value of the tracking counter is stopped, and the temporary tracking identification is converted to a confirmed tracking identification.

Optionally, in a case that the candidate pedestrian detection box matches the existing tracking box, adding 1 to the value of the tracking counter; where, the tracking counter is established after the candidate pedestrian detection box is detected for a first time, and an initial value of the tracking counter is 0.

Optionally, in a case that the candidate pedestrian detection box matches the existing tracking box, adding 1 to the value of the tracking counter; in a case that the candidate pedestrian detection box does not match the existing tracking box, subtracting 1 from the value of the tracking counter; where the tracking counter is established after the candidate pedestrian detection box is detected for a first time, and an initial value of the tracking counter is an integer lager than 0.

Optionally, in a case that the value of the tracking counter is smaller than a second preset threshold, deleting the candidate pedestrian detection box, where the second preset threshold is smaller than the first preset threshold.

Optionally, the determining whether each of the plurality of candidate pedestrian detection boxes matches the existing tracking box includes: calculating a feature distance between the candidate pedestrian detection box and tracking boxes in previous N frames of images of the current frame of image to be detected, in a case that the feature distance is smaller than a third preset threshold, determining that the candidate pedestrian detection box matches the existing tracking box, and in a case that the feature distance is larger than or equal to the third preset threshold, determining that the candidate pedestrian detection box does not match the existing tracking box, where N is an integer larger than 1.

Optionally, the calculating the feature distance between the candidate pedestrian detection box and the tracking boxes in the previous N frames of images of the current frame of image to be detected includes: calculating a feature of the candidate pedestrian detection box; calculating a distance dist(n) between the feature of the candidate pedestrian detection box and a feature of a tracking box in a previous $n^{th}$ frame of image of the current frame of image to be detected, where n is an integer larger than or equal to 1 and smaller than or equal to N; and calculating the feature distance $D_{mean}$ through the following formula:

$$D_{mean} = \frac{1}{N}D, D = \sum_{n=1}^{N}dist(n).$$

Optionally, subsequent to the detecting the plurality of candidate pedestrian detection boxes in the current frame of image to be detected, the method further includes: for each of the plurality of candidate pedestrian detection boxes in the current frame of image to be detected, calculating partial intersection-over-unions between the candidate pedestrian detection box and other respective candidate pedestrian detection boxes; in a case that any one of partial intersection-over-unions is larger than a fourth preset threshold, not storing the feature of the candidate pedestrian detection box; and in a case that all partial intersection-over-unions are smaller than or equal to the fourth preset threshold, storing the feature of the candidate pedestrian detection box as a feature of a tracking box in a current frame of image.

Optionally, the partial intersection-over-union is $$\text{partial\_iou} = \frac{A \cap B}{A},$$

where A is the candidate pedestrian detection box, and B is any one of other candidate pedestrian detection boxes.

A multi-target pedestrian tracking apparatus is further provided in an embodiment of the present disclosure, including: a detection module, configured to detect a plurality of candidate pedestrian detection boxes in a current frame of image to be detected, where a temporary tracking identification and a tracking counter are set for each of the plurality of candidate pedestrian detection boxes; a determination module, configured to determine whether each of the plurality of candidate pedestrian detection boxes matches an existing tracking box, update a value of the tracking counter according to a determination result, and continue to detect a next frame of image to be detected; and a processing module, configured to, in a case that the value of the tracking counter reaches a first preset threshold, stop updating the value of the tracking counter, and convert the temporary tracking identification to a confirmed tracking identification.

Optionally, the determination module is configured to, in a case that the candidate pedestrian detection box matches the existing tracking box, add 1 to the value of the tracking counter; where the tracking counter is established after the candidate pedestrian detection box is detected for a first time, and an initial value of the tracking counter is 0.

Optionally, the determination module is configured to, in a case that the candidate pedestrian detection box matches the existing tracking box, add 1 to the value of the tracking counter; in a case that the candidate pedestrian detection box does not match the existing tracking box, subtract 1 from the value of the tracking counter; where the tracking counter is established after the candidate pedestrian detection box is detected for a first time, and an initial value of the tracking counter is an integer lager than 0.

Optionally, the pedestrian tracking apparatus further includes: a deletion module configured to, in a case that the value of the tracking counter is smaller than a second preset threshold, delete the candidate pedestrian detection box, where the second preset threshold is smaller than the first preset threshold.

Optionally, the determination module includes: a calculation unit configured to, calculate a feature distance between the candidate pedestrian detection box and tracking boxes in previous N frames of images of the current frame of image to be detected, in a case that the feature distance is smaller than a third preset threshold, determine that the candidate pedestrian detection box matches the existing tracking box, and in a case that the feature distance is larger than or equal to the third preset threshold, determine that the candidate pedestrian detection box does not match the existing tracking box, where N is an integer larger than 1.

Optionally, the calculation unit is further configured to: calculate a feature of the candidate pedestrian detection box; calculate a distance $dist(n)$ between the feature of the candidate pedestrian detection box and a feature of a tracking box in a previous $n^{th}$ frame of image of the current frame of image to be detected, where n is an integer larger than or equal to 1 and smaller than or equal to N; and calculate the feature distance $D_{mean}$ through the following formula:

$$D_{mean} = \frac{1}{N}D, D = \sum_{n=1}^{N} dist(n).$$

Optionally, the pedestrian tracking apparatus further includes: a calculation module configured to, for each of the plurality of candidate pedestrian detection boxes in the current frame of image to be detected, calculate partial intersection-over-unions between the candidate pedestrian detection box and other respective candidate pedestrian detection boxes; in a case that any one of partial intersection-over-unions is larger than a fourth preset threshold, not store the feature of the candidate pedestrian detection box; and in a case that all partial intersection-over-unions are smaller than or equal to the fourth preset threshold, store the feature of the candidate pedestrian detection box as a feature of a tracking box in a current frame of image.

Optionally, the partial intersection-over-union is $$\text{partial\_iou} = \frac{A \cap B}{A},$$

where A is the candidate pedestrian detection box, and B is any one of other candidate pedestrian detection boxes.

A multi-target pedestrian tracking device is further provided in an embodiment of the present disclosure, including: a memory, a processor, and a computer program stored in the memory and executable by the processor, the processor is configured to execute the computer program to perform the multi-target pedestrian tracking method as described above.

A computer-readable storage medium storing a computer program is further provided in an embodiment of the present disclosure, the computer program is executed by a processor to perform the multi-target pedestrian tracking method as described above.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Obviously, the following drawings merely relate to some embodiments of the present disclosure, and based on these drawings, a person of ordinary skill in the art may obtain other drawings without any creative effort.

DETAILED DESCRIPTION

Figure 1:
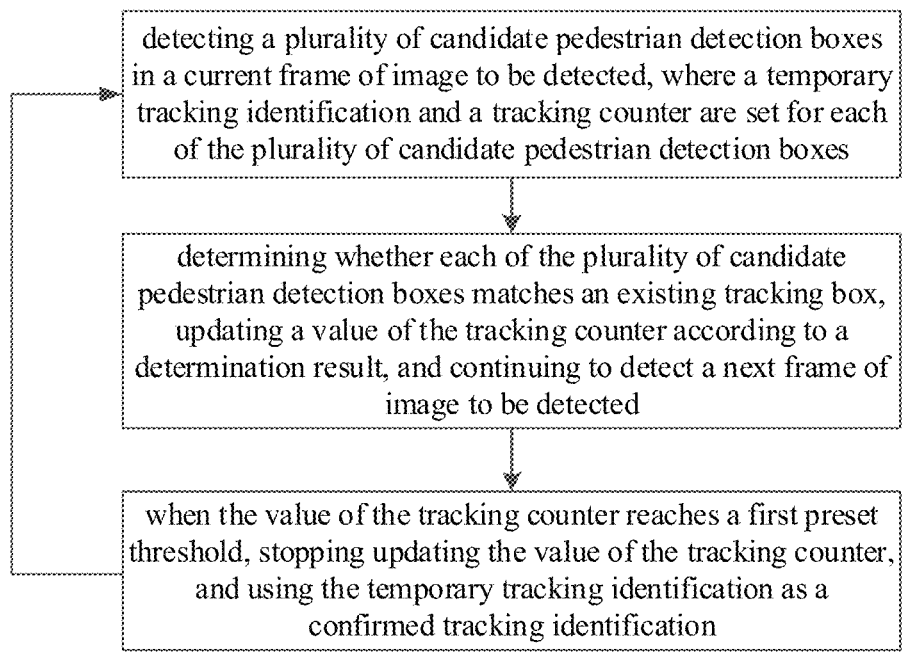
FIG. 1 is a flow chart illustrating a pedestrian tracking method according to an embodiment of the present disclosure.

In order to make the technical problems to be solved, the technical solutions and the advantages of the present disclosure more apparent, a detailed description will be below with reference to the accompanying drawings and specific embodiments.

Exemplary embodiments of the present disclosure will be described hereinafter in more detail with reference to the accompanying drawings. Although exemplary embodiments of the present disclosure are shown in the drawings, it should be appreciated that the present disclosure may be implemented in various forms and should not be limited by the exemplary embodiments. On the contrary, these embodiments are provided to enable a thorough understanding of the present disclosure and to convey the scope of the present disclosure to a person skilled in the art.

Due to a large number of blockings and crossings between pedestrians in multi-pedestrian tracking in a video, a tracking-by-detection framework is used for tracking in the related art. Pedestrian target detection is performed on a video frame first. Detected targets are differentiated from each other by using an intersection-over-union (IOU) and a pedestrian re-identification feature, matching is performed on a detection result and a tracking result by using a Hungarian algorithm, and then a Kalman filter is used for tracking. However, the above tracking-by-detection framework has the following shortcomings in practical applications.

(1) Insufficient robustness of tracking identification switching. When a pedestrian detection box is mistakenly detected in a frame of image, a new tracking identification is created for the pedestrian detection box. Similarly, when a missed detection of a pedestrian candidate box in a frame of image occurs, the pedestrian candidate box is deleted.

(2) In a multi-pedestrian scenario, a target pedestrian detection box may often include part of another target pedestrian, so that re-identification features of two target pedestrian detection boxes may be extraordinarily similar to each other, which may bring difficulty and error to feature matching.

(3) In addition, when performing a matching between the target pedestrian detection box and a tracking box, only a cosine distance between features is calculated, and a tracking box having a smallest distance to the target pedestrian detection box is selected. The information used is less, and there may be errors in feature matching.

In order to solve the above problems, a pedestrian tracking method, a pedestrian tracking apparatus and a pedestrian tracking device are provided in the embodiments of the present disclosure, so as to improve the accuracy of pedestrian tracking.

A multi-target pedestrian tracking method is provided in an embodiment of the present disclosure. As shown in FIG. 1, the method includes: detecting a plurality of candidate pedestrian detection boxes in a current frame of image to be detected, where a temporary tracking identification and a tracking counter are set for each of the plurality of candidate pedestrian detection boxes; and determining whether each of the plurality of candidate pedestrian detection boxes matches an existing tracking box, updating a value of the tracking counter according to a determination result, and continuing to detect a next frame of image to be detected, where, when the value of the tracking counter reaches a first preset threshold, the updating the value of the tracking counter is stopped, and the temporary tracking identification is converted to a confirmed tracking identification.

Optionally, when the candidate pedestrian detection box matches the existing tracking box, adding 1 to the value of the tracking counter; where, the tracking counter is established after the candidate pedestrian detection box is detected for a first time, and an initial value of the tracking counter is 0.

Or, optionally, when the candidate pedestrian detection box matches the existing tracking box, adding 1 to the value of the tracking counter; when the candidate pedestrian detection box does not match the existing tracking box, subtracting 1 from the value of the tracking counter; where the tracking counter is established after the candidate pedestrian detection box is detected for a first time, and an initial value of the tracking counter is an integer lager than 0.

In the embodiment, after the candidate pedestrian detection box in the current frame of image to be detected has been detected, whether the candidate pedestrian detection box matches the existing tracking box is determined. For each fame of image to be detected, when the candidate pedestrian detection box matches the existing tracking box, the temporary tracking identification of the candidate pedestrian detection box is updated, and the value of the tracking counter is updated according to the determination result. When the value of the tracking counter is larger than the first preset threshold, the temporary tracking identification is converted to the confirmed tracking identification, and the candidate pedestrian detection box is determined as a target pedestrian detection box. In this way, the robustness of the switching of the tracking identification may be improved, and it may be avoided that a new tracking identification is created for a pedestrian detection box after the pedestrian detection box has been detected mistakenly in a frame of image, which may improve the accuracy of pedestrian tracking.

The value of the first threshold may be set according to practical applications. A difference between the first threshold and the initial value of the tracking counter should be larger than 1, so as to avoid that after a pedestrian detection box has been mistakenly detected in a frame of image, the pedestrian detection box is determined to be the target pedestrian detection box, and then a new tracking identification is created for the pedestrian detection box.

In a specific embodiment, the method further includes: when the value of the tracking counter is smaller than a second preset threshold, deleting the candidate pedestrian detection box, where the second preset threshold is smaller than the first preset threshold.

In this embodiment, the value of the tracking counter is determined. When the value of the tracking counter is smaller than the second preset threshold, the candidate pedestrian detection box is deleted. By setting the value of the second threshold, it may be avoided that a pedestrian candidate box is deleted when a missed detection of the pedestrian candidate box in a frame of image occurs.

In a specific embodiment, the determining whether each of the plurality of candidate pedestrian detection boxes matches the existing tracking box includes: calculating a feature distance between the candidate pedestrian detection box and tracking boxes in previous N frames of images of the current frame of image to be detected, when the feature distance is smaller than a third preset threshold, determining that the candidate pedestrian detection box matches the existing tracking box, and when the feature distance is larger than or equal to the third preset threshold, determining that the candidate pedestrian detection box does not match the existing tracking box, where N is an integer larger than 1.

In this embodiment, in order to determine whether the candidate pedestrian detection box matches the existing tracking box in a better manner, features of the previous N frames of images of the current frame are accumulated, and the feature distance is calculated based on the previous N frames of images of the current frame, so as to reduce an error of feature matching, thereby improving the accuracy of pedestrian tracking.

In a specific embodiment, the calculating the feature distance between the candidate pedestrian detection box and the tracking boxes in the previous N frames of images of the current frame of image to be detected includes: calculating a feature of the candidate pedestrian detection box; calculating a distance dist(n) between the feature of the candidate pedestrian detection box and a feature of a tracking box in a previous nth frame of image of the current frame of image to be detected, where n is an integer larger than or equal to 1 and smaller than or equal to N; and calculating the feature distance $D_{mean}$ through the following formula:

$$D_{mean} = \frac{1}{N}D, \quad D = \sum_{n=1}^{N} dist(n).$$

In a specific embodiment, subsequent to the detecting the plurality of candidate pedestrian detection boxes in the current frame of image to be detected, the method further includes: for each of the plurality of candidate pedestrian detection boxes in the current frame of image to be detected, calculating partial intersection-over-unions between the candidate pedestrian detection box and other respective candidate pedestrian detection boxes; when any one of partial intersection-over-unions is larger than a fourth preset threshold, not storing the feature of the candidate pedestrian detection box; and when all partial intersection-over-unions are smaller than or equal to the fourth preset threshold, storing the feature of the candidate pedestrian detection box as a feature of a tracking box in a current frame of image.

In a multi-pedestrian scenario, the target pedestrian detection box may often include part of another target pedestrian, so that re-identification features of two target pedestrian detection boxes may be extraordinarily similar to each other, which may bring difficulty and error to feature matching, and may affect the accuracy of the pedestrian tracking. The partial intersection-over-union between each candidate pedestrian detection box and other respective candidate pedestrian detection boxes is calculated in this embodiment. When the partial intersection-over-union is large, the feature of the candidate pedestrian detection box is not stored. Thus, a feature matching is not performed on the feature of the candidate pedestrian detection box which is not stored, thereby reducing the difficulty and error of the feature matching, helping to improve the accuracy of the pedestrian tracking.

In a specific embodiment, the partial intersection-over-union is $$\text{partial\_iou} = \frac{A \cap B}{A},$$

where A is the candidate pedestrian detection box, and B is any one of other candidate pedestrian detection boxes. In this way, when a candidate pedestrian detection box A is included by a candidate pedestrian detection box B, a partial IOU of A is large. When the candidate pedestrian detection box B is included by the candidate pedestrian detection box A, the partial IOU of A is small. When the partial IOU of the candidate pedestrian detection box A to the candidate pedestrian detection box B is large, it means that the candidate pedestrian detection box B includes most region of the candidate pedestrian detection box A. Thus, a noticeable differentiate effect may not be achieved by using a reid (re-identification) feature of the candidate pedestrian detection box A, and the reid feature of the candidate pedestrian detection box A is not used to calculate the feature distance.

Figure 2:
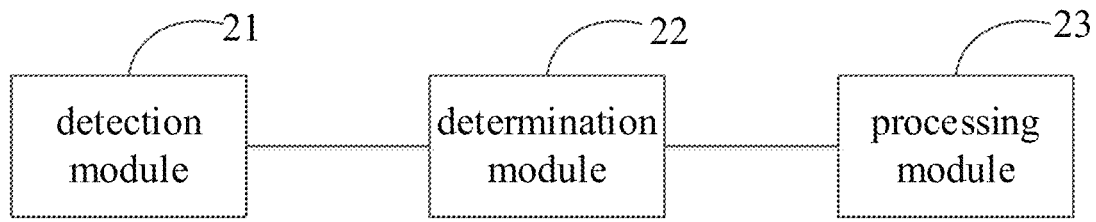
FIG. 2 is a structural block diagram of a pedestrian tracking apparatus according to an embodiment of the present disclosure.

A pedestrian tracking apparatus is further provided in an embodiment of the present disclosure. As shown in FIG. 2, the pedestrian tracking apparatus includes: a detection module 21, configured to detect a plurality of candidate pedestrian detection boxes in a current frame of image to be detected, where a temporary tracking identification and a tracking counter are set for each of the plurality of candidate pedestrian detection boxes; a determination module 22, configured to determine whether each of the plurality of candidate pedestrian detection boxes matches an existing tracking box, update a value of the tracking counter according to a determination result, and continue to detect a next frame of image to be detected; and a processing module 23, configured to, when the value of the tracking counter reaches a first preset threshold, stop updating the value of the tracking counter, and convert the temporary tracking identification to a confirmed tracking identification.

Optionally, the determination module 22 is configured to, when the candidate pedestrian detection box matches the existing tracking box, add 1 to the value of the tracking counter; where, the tracking counter is established after the candidate pedestrian detection box is detected for a first time, and an initial value of the tracking counter is 0.

Or, optionally, the determination module 22 is configured to, when the candidate pedestrian detection box matches the existing tracking box, add 1 to the value of the tracking counter; when the candidate pedestrian detection box does not match the existing tracking box, subtract 1 from the value of the tracking counter; where the tracking counter is established after the candidate pedestrian detection box is detected for a first time, and an initial value of the tracking counter is an integer lager than 0.

In the embodiment, after the candidate pedestrian detection box in the current frame of image to be detected has been detected, whether the candidate pedestrian detection box matches the existing tracking box is determined. When the candidate pedestrian detection box matches the existing tracking box, 1 is added to the value of the tracking counter. When the candidate pedestrian detection box does not match the existing tracking box, 1 is subtracted from the value of the tracking counter. When the value of the tracking counter is larger than the first preset threshold, the candidate pedestrian detection box is determined to be a target pedestrian detection box. In this way, the robustness of the switching of the tracking identification may be improved, and it may be avoided that a new tracking identification is created for a pedestrian detection box after the pedestrian detection box has been detected mistakenly in a frame of image, which may improve the accuracy of pedestrian tracking.

The value of the first threshold may be set according to practical applications. A difference between the first threshold and the initial value of the tracking counter should be larger than 1, so as to avoid that after a pedestrian detection box has been mistakenly detected in a frame of image, the pedestrian detection box is determined to be the target pedestrian detection box, and then a new tracking identification is created for the pedestrian detection box.

In a specific embodiment, the pedestrian tracking apparatus further includes: a deletion module configured to, when the value of the tracking counter is smaller than a second preset threshold, delete the candidate pedestrian detection box, where the second preset threshold is smaller than the first preset threshold.

In this embodiment, the value of the tracking counter is determined. When the value of the tracking counter is smaller than the second preset threshold, the candidate pedestrian detection box is deleted. By setting the value of the second threshold, it may be avoided a pedestrian candidate box is deleted when a missed detection of the pedestrian candidate box in a frame of image occurs.

In a specific embodiment, the determination module includes: a calculation unit configured to, calculate a feature distance between the candidate pedestrian detection box and tracking boxes in previous N frames of images of the current frame of image to be detected, when the feature distance is smaller than a third preset threshold, determine that the candidate pedestrian detection box matches the existing tracking box, and when the feature distance is larger than or equal to the third preset threshold, determine that the candidate pedestrian detection box does not match the existing tracking box, where N is an integer larger than 1.

In this embodiment, in order to determine whether the candidate pedestrian detection box matches the existing tracking box in a better manner, features of the previous N frames of images of the current frame are accumulated, and the feature distance is calculated based on the previous N frames of images of the current frame, so as to reduce an error of feature matching, thereby improving the accuracy of pedestrian tracking.

In a specific embodiment, the calculation unit is further configured to: calculate a feature of the candidate pedestrian detection box; calculate a distance dist(n) between the feature of the candidate pedestrian detection box and a feature of a tracking box in a previous $n^{th}$ frame of image of the current frame of image to be detected, where n is an integer larger than or equal to 1 and smaller than or equal to N; and calculate the feature distance $D_{mean}$ through the following formula:

$$D_{mean} = \frac{1}{N}D, D = \sum_{n=1}^{N} dist(n).$$

In a specific embodiment, the pedestrian tracking apparatus further includes: a calculation module configured to, for each of the plurality of candidate pedestrian detection boxes in the current frame of image to be detected, calculate partial intersection-over-unions between the candidate pedestrian detection box and other respective candidate pedestrian detection boxes; when any one of partial intersection-over-unions is larger than a fourth preset threshold, not store the feature of the candidate pedestrian detection box; and when all partial intersection-over-unions are smaller than or equal to the fourth preset threshold, store the feature of the candidate pedestrian detection box as a feature of a tracking box in a current frame of image.

In a multi-pedestrian scenario, a target pedestrian detection box may often include part of another target pedestrian, so that re-identification features of two target pedestrian detection boxes may be extraordinarily similar to each other, which may bring difficulty and error to feature matching, and may affect the accuracy of the pedestrian tracking. The partial intersection-over-union between each candidate pedestrian detection box and other respective candidate pedestrian detection boxes is calculated in this embodiment. When the partial intersection-over-union is large, the feature of the candidate pedestrian detection box is not stored. Thus, feature matching is not performed on the feature of the not stored candidate pedestrian detection box, thereby reducing the difficulty and error of the feature matching, helping to improve the accuracy of the pedestrian tracking.

In a specific embodiment, the partial intersection-over-union is $$\text{partial\_iou} = \frac{A \cap B}{A},$$

where A is the candidate pedestrian detection box, and B is any one of other candidate pedestrian detection boxes. In this way, when a candidate pedestrian detection box A is included by a candidate pedestrian detection box B, a partial IOU of A is large. When the candidate pedestrian detection box B is included by the candidate pedestrian detection box A, the partial IOU of A is small. When the partial IOU of the candidate pedestrian detection box A to the candidate pedestrian detection box B is large, it means that the candidate pedestrian detection box B includes most region of the candidate pedestrian detection box A. Thus, a noticeable differentiate effect may not be achieved by using a reid feature of the candidate pedestrian detection box A, and the reid feature of the candidate pedestrian detection box A is not used to calculate the feature distance.

Figure 3:
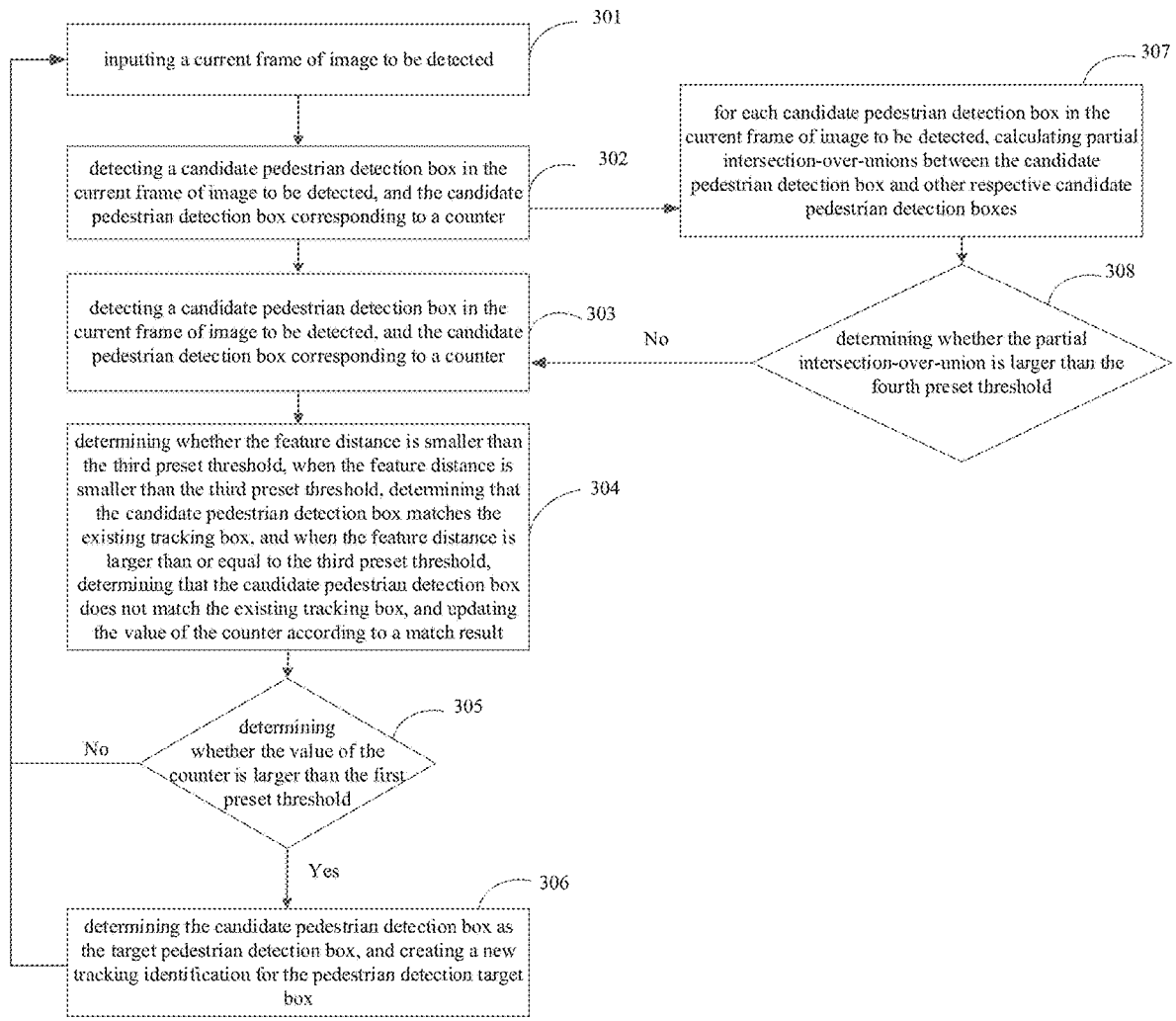
FIG. 3 is a flow chart illustrating the pedestrian tracking method according to an embodiment of the present disclosure.

In a specific embodiment, as shown in FIG. 3, the pedestrian tracking method includes the following steps.

Step 301, inputting a current frame of image to be detected.

A video to be detected includes a plurality of frames of images to be detected, and pedestrian tracking operation needs to be performed separately for each frame of image to be detected.

Step 302, detecting a candidate pedestrian detection box in the current frame of image to be detected, the candidate pedestrian detection box corresponding to a counter, and proceeding with step 303 or step 307.

For each new candidate pedestrian detection box, a temporary tracking identification is established, and two tracking counters, i.e., a counter a and a counter b, are set. An initial value of the counter a may be set to 0, and 1 may be added to the value of the counter a each time. When the value of the counter a is equal to a counting threshold thr1, the temporary tracking identification is converted to a confirmed tracking identification, the candidate pedestrian detection box is determined as a target pedestrian detection box, and the tracking is continued. An initial value of the counter b may be set to a constant larger than zero. In each frame of image to be detected, when the candidate pedestrian detection box matches an existing tracking box, the temporary tracking identification of the candidate pedestrian detection box is updated, and 1 is added to the value of counter b. When the candidate pedestrian detection box does not match the existing tracking box, 1 is subtracted from the value of counter b. When the value of counter b is equal to a counting threshold thr2 or the temporary tracking identification is converted to the confirmed tracking identification, the value of the counter b is stopped updating. When the value of the counter b is decreased to be 0, the candidate pedestrian detection box is deleted. The counter a and the counter b may be a same counter. At this time, thr1 is equal to thr2, both thr1 and thr2 are equal to the first threshold.

Step 303, calculating a feature distance between the candidate pedestrian detection box and tracking boxes in previous N frames of images of the current frame of image to be detected.

In this embodiment, a matching is performed on the candidate pedestrian detection box and the tracking box by using a 128-dimensional reid feature vector through a Deepsort algorithm. In order to perform the matching in a better manner, a weighted accumulation is performed on a distance between the current frame and the respective previous N frames of images through the Deepsort algorithm, and matching is performed among features.

A distance dist(n) between the feature of the candidate pedestrian detection box and a feature of a tracking box in a previous $n^{th}$ frame of image of the current frame is calculated, where n is an integer larger than or equal to 1 and smaller than or equal to N. A value of n ranges from 1 to N, and N distance calculation results may be acquired. The feature distance may be a cosine distance. In addition to the cosine distance, other feature distance measurement methods may also be used.

Feature distances of frames are used as weights, and accumulated to acquire an accumulation value of the feature distance, i.e., $$D = \sum_{n=1}^{N} dist(n).$$

An average of the weighted accumulation value is used as a final feature distance, i.e., $$D_{mean} = \frac{1}{N}D.$$

Step 304, determining whether the feature distance is smaller than the third preset threshold, when the feature distance is smaller than the third preset threshold, determining that the candidate pedestrian detection box matches the existing tracking box, and when the feature distance is larger than or equal to the third preset threshold, determining that the candidate pedestrian detection box does not match the existing tracking box, and updating the value of the counter according to a match result.

Step 305, determining whether the value of the counter is larger than the first preset threshold. When the value of the counter is larger than the first preset threshold, proceeding with step 306. When the value of the counter is not larger than the first preset threshold, acquiring a next frame of image to be detected, returning to step 301.

Step 306, determining the candidate pedestrian detection box as the target pedestrian detection box, and creating a new tracking identification for the pedestrian detection target box.

Then acquiring the next frame of image to be detected, returning to step 301.

Step 307, for each candidate pedestrian detection box in the current frame of image to be detected, calculating partial intersection-over-unions between the candidate pedestrian detection box and other respective candidate pedestrian detection boxes.

Figure 4:
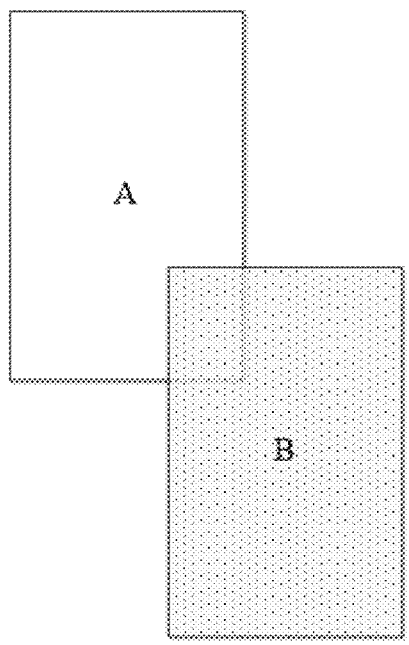
FIG. 4-FIG. 6 are schematic diagrams of calculating a partial intersection-over-union.
Figure 5:
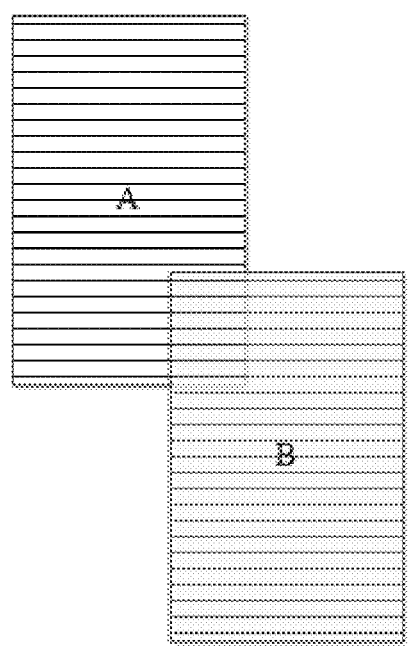
Figure 6:
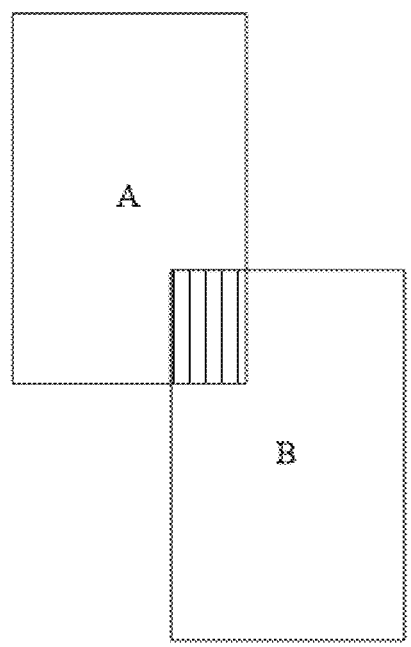

As a supplement to the reid feature, IOU may play an assistant role on pedestrian tracking. However, in a multi-pedestrian scenario, a conventional IOU has some drawbacks. As shown in FIG. 4-FIG. 6, there is an overlapping region between the candidate pedestrian detection box A and the candidate pedestrian detection box B. A union of the candidate pedestrian detection box A and the candidate pedestrian detection box B is a part filled with horizontal lines in FIG. 5. An intersection of the candidate pedestrian detection box A and the candidate pedestrian detection box B is a part filled with vertical lines in FIG. 6. The conventional IOU is a ratio of the intersection (A∩B) of A and B and the union (A∪B) of A and B. However, in the multi-pedestrian scenario, the candidate pedestrian detection box A may include a part of the candidate pedestrian detection box B, especially most of the candidate pedestrian detection box B, a feature distance between a reid feature of the candidate pedestrian detection box A and a reid feature of the candidate pedestrian detection box B may be too small, so that the feature matching may fail and a mistake may occur in tracking. In view of the problem, a method for calculating a partial IOU is provided in this embodiment. For each candidate pedestrian detection box in the current frame, a partial intersection-over-union between the candidate pedestrian detection box and other respective candidate pedestrian detection boxes is calculated. The partial intersection-over-union is $$\text{partial\_iou} = \frac{A \cap B}{A}.$$

When the candidate pedestrian detection box A is included by the candidate pedestrian detection box B, a partial IOU of the candidate pedestrian detection box A is large. When the candidate pedestrian detection box B is included by the candidate pedestrian detection box A, the partial IOU of the candidate pedestrian detection box A is small. When the partial IOU of the candidate pedestrian detection box A to the candidate pedestrian detection box B is large, it means that the candidate pedestrian detection box B includes most region of the candidate pedestrian detection box A. Thus, a noticeable differentiate effect may not be achieved by using the reid feature of the candidate pedestrian detection box A, and the reid feature of the candidate pedestrian detection box A is not used to calculate the feature distance. Otherwise, the feature of the candidate pedestrian detection box A is included for calculation and used to calculating the feature distance between the candidate pedestrian detection box A and the respective tracking boxes in previous N frames of images of the current frame of image to be detected.

Step 308, determining whether the partial intersection-over-union is larger than the fourth preset threshold. When any one of partial intersection-over-unions is larger than the fourth preset threshold, the feature of the candidate pedestrian detection box is not stored. When all partial intersection-over-unions are smaller than or equal to the fourth preset threshold, the feature of the candidate pedestrian detection box is stored as a feature of a tracking box in a current frame of image. The feature of the tracking box in the current frame of image is used to calculate the feature distance in step 303.

In the embodiment, after the candidate pedestrian detection box in the current frame of image to be detected has been detected, whether the candidate pedestrian detection box matches the existing tracking box is determined. For each fame of image to be detected, when the candidate pedestrian detection box matches the existing tracking box, the temporary tracking identification of the candidate pedestrian detection box is updated, and the value of the tracking counter is updated according to the determination result. When the value of the tracking counter is larger than the first preset threshold, the temporary tracking identification is converted to the confirmed tracking identification, and the candidate pedestrian detection box is determined to be a target pedestrian detection box. In this way, the robustness of the switching of the tracking identification may be improved, and it may be avoided that a new tracking identification is created for a pedestrian detection box after the pedestrian detection box has been detected mistakenly in a frame of image, which may improve the accuracy of pedestrian tracking.

A pedestrian tracking device is further provided in an embodiment of the present disclosure, including: a memory, a processor, and a computer program stored in the memory and executable by the processor, the processor is configured to execute the computer program to perform the pedestrian tracking method as described above.

A computer-readable storage medium storing a computer program is further provided in an embodiment of the present disclosure, the computer program is executed by a processor to perform the pedestrian tracking method as described above.

It should be appreciated that, the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), general processors, controllers, micro-controllers, microprocessors, other electronic units designed to perform functions described herein, or a combination thereof.

For a software implementation, technologies described herein may be implemented by modules (e.g., procedures, functions, etc.) that perform the functions described herein. The software code may be stored in the memory and executed by the processor. The memory may be implemented within the processor or external to the processor.

Each embodiment in the specification is described in a progressive manner and focuses on the differences from other embodiments. For the description of same or similar parts between various embodiments, a cross-reference may be made to the embodiments.

A person skilled in the art may appreciate that the present disclosure may be provided as a method, an apparatus, or a computer program product. Accordingly, the present disclosure may be implemented in the form of an entirely hardware embodiment, an entirely software embodiment, or an embodiment combining software and hardware aspects. Moreover, the present disclosure may be implemented in the form of the computer program product to be carried out on one or more computer usable storage medium (including but not limit to a disk memory, a CD-ROM, an optical memory etc.) including programming codes that may be executed by computers.

The present disclosure is described with reference to flowcharts and/or block diagrams of methods, terminal devices (systems) and computer program products according to the embodiments of the present disclosure. It should be appreciated that, each flow and/or block of flowcharts and/or block diagrams and a combination of the flows and/or blocks in the flowcharts and/or block diagrams may be implemented by computer program instructions. These computer program instructions may be provided to a processor of a general purpose computer, a special purpose computer, an embedded processor or other programmable data processing terminal device to generate a machine, so that the instructions executed by a processor of a computer or other programmable data processing terminal device cause to generate a device for implementing the functions designated in one or more flows of the flowcharts or in one or more blocks of the block diagrams.

The computer program instructions may also be stored in a computer readable memory that may direct a computer or other programmable data processing terminal devices to operate in a particular manner, such that instructions stored in the computer readable memory generate an article of manufacture including the instruction device, and the instruction device implements the functions designated in one or more flows of the flowcharts or in one or more blocks of the block diagrams.

The computer program instructions may also be loaded onto a computer or other programmable data processing terminal device such that a series of operational steps are performed on the computer or other programmable terminal device to produce computer-implemented processing, such that the instructions executed on a computer or other programmable terminal device provide steps for implementing the functions designated in one or more flows of the flowcharts or in one or more blocks of the block diagrams.

Although some embodiments of the present disclosure have been already described, once a person skilled in the art understand a basic creative concept, additional modifications and changes for these embodiments may be made. Therefore, the appended claims are intended to be construed as including optional embodiments and all changes and modifications that fall within the scope of the embodiments of the present disclosure.

It should be noted that in the present disclosure, relational terms such as first and second are used only to distinguish one entity or operation from another entity or operation, and do not necessarily require or imply that there is any such actual relationship or order between the entities or operations. Moreover, a term "include", "have" or any other variation thereof are intended to encompass non-exclusive inclusion, such that a process, a method, a product or a device including a series of elements includes not only those elements, but also other elements not explicitly listed, or elements inherent to the process, method, product or terminal device. Without more restrictions, an element defined by an expression "including a . . . " does not exclude the existence of other identical elements in the process, method, product or device including the element.

The above are merely some embodiments of the present disclosure. It should be noted that those skilled in the art may make various improvements and embellishments without departing from the principle disclosed in the present disclosure, and the improvements and embellishments should also fall within the scope of the present disclosure.

What is claimed is:

1. A multi-target pedestrian tracking method, comprising:
   detecting a plurality of candidate pedestrian detection boxes in a current frame of image to be detected, wherein a temporary tracking identification and a tracking counter are set for each of the plurality of candidate pedestrian detection boxes; and
   determining whether each of the plurality of candidate pedestrian detection boxes matches an existing tracking box, updating a value of the tracking counter according to a determination result, and continuing to detect a next frame of image to be detected, wherein in a case that the value of the tracking counter reaches a first preset threshold, the updating the value of the tracking counter is stopped, and the temporary tracking identification is converted to a confirmed tracking identification;
   wherein the determining whether each of the plurality of candidate pedestrian detection boxes matches the existing tracking box comprises:
   calculating a feature distance between the candidate pedestrian detection box and tracking boxes in previous N frames of images of the current frame of image to be detected,
   in a case that the feature distance is smaller than a third preset threshold, determining that the candidate pedestrian detection box matches the existing tracking box, and
   in a case that the feature distance is larger than or equal to the third preset threshold, determining that the candidate pedestrian detection box does not match the existing tracking box, wherein N is an integer larger than 1;

wherein the calculating the feature distance between the candidate pedestrian detection box and the tracking boxes in the previous N frames of images of the current frame of image to be detected comprises:

calculating a feature of the candidate pedestrian detection box;

calculating a distance dist(n) between the feature of the candidate pedestrian detection box and a feature of a tracking box in a previous $n^{th}$ frame of image of the current frame of image to be detected, wherein n is an integer larger than or equal to 1 and smaller than or equal to N; and calculating the feature distance $D_{mean}$ through the following formula:

$$D_{mean} = \frac{1}{N}D, D = \sum_{n=1}^{N} dist(n).$$

2. The multi-target pedestrian tracking method according to claim 1, wherein the updating the value of the tracking counter according to the determination result comprises:

in a case that the candidate pedestrian detection box matches the existing tracking box, adding 1 to the value of the tracking counter; wherein the tracking counter is established after the candidate pedestrian detection box is detected for a first time, and an initial value of the tracking counter is 0.

3. The multi-target pedestrian tracking method according to claim 1, wherein the updating the value of the tracking counter according to the determination result comprises:

in a case that the candidate pedestrian detection box matches the existing tracking box, adding 1 to the value of the tracking counter; in a case that the candidate pedestrian detection box does not match the existing tracking box, subtracting 1 from the value of the tracking counter; wherein the tracking counter is established after the candidate pedestrian detection box is detected for a first time, and an initial value of the tracking counter is an integer lager than 0.

4. The multi-target pedestrian tracking method according to claim 3, wherein in a case that the value of the tracking counter is smaller than a second preset threshold, deleting the candidate pedestrian detection box, wherein the second preset threshold is smaller than the first preset threshold.

5. The multi-target pedestrian tracking method according to claim 1, wherein subsequent to the detecting the plurality of candidate pedestrian detection boxes in the current frame of image to be detected, the method further comprises:

for each of the plurality of candidate pedestrian detection boxes in the current frame of image to be detected, calculating partial intersection-over-unions between the candidate pedestrian detection box and other respective candidate pedestrian detection boxes;

in a case that any one of partial intersection-over-unions is larger than a fourth preset threshold, not storing the feature of the candidate pedestrian detection box; and in a case that all partial intersection-over-unions are smaller than or equal to the fourth preset threshold, storing the feature of the candidate pedestrian detection box as a feature of a tracking box in a current frame of image.

6. The multi-target pedestrian tracking method according to claim 5, wherein the partial intersection-over-union is $$\text{partial\_iou} = \frac{A \cap B}{A},$$

wherein A is the candidate pedestrian detection box, and B is any one of other candidate pedestrian detection boxes.

7. A multi-target pedestrian tracking apparatus, comprising:

a memory, a processor, and a computer program stored in the memory and executable by the processor, the processor is configured to execute the computer program to:

detect a plurality of candidate pedestrian detection boxes in a current frame of image to be detected, wherein a temporary tracking identification and a tracking counter are set for each of the plurality of candidate pedestrian detection boxes;

determine whether each of the plurality of candidate pedestrian detection boxes matches an existing tracking box, update a value of the tracking counter according to a determination result, and continue to detect a next frame of image to be detected; and in a case that the value of the tracking counter reaches a first preset threshold, stop updating the value of the tracking counter, and convert the temporary tracking identification to a confirmed tracking identification;

wherein the processor is configured to execute the computer program to:

calculate a feature distance between the candidate pedestrian detection box and tracking boxes in previous N frames of images of the current frame of image to be detected, in a case that the feature distance is smaller than a third preset threshold, determine that the candidate pedestrian detection box matches the existing tracking box, and in a case that the feature distance is larger than or equal to the third preset threshold, determine that the candidate pedestrian detection box does not match the existing tracking box, wherein N is an integer larger than 1;

wherein the processor is configured to execute the computer program to:

calculate a feature of the candidate pedestrian detection box;

calculate a distance dist(n) between the feature of the candidate pedestrian detection box and a feature of a tracking box in a previous $n^{th}$ frame of image of the current frame of image to be detected, wherein n is an integer larger than or equal to 1 and smaller than or equal to N; and calculate the feature distance $D_{mean}$ through the following formula:

$$D_{mean} = \frac{1}{N}D, D = \sum_{n=1}^{N} dist(n).$$

8. The multi-target pedestrian tracking apparatus according to claim 7, wherein the processor is configured to execute the computer program to: in a case that the candidate pedestrian detection box matches the existing tracking box, add 1 to the value of the tracking counter; wherein the tracking counter is established after the candidate pedestrian detection box is detected for a first time, and an initial value of the tracking counter is 0.

9. The multi-target pedestrian tracking apparatus according to claim 7, wherein the processor is configured to execute the computer program to: in a case that the candidate pedestrian detection box matches the existing tracking box, add 1 to the value of the tracking counter; in a case that the candidate pedestrian detection box does not match the existing tracking box, subtract 1 from the value of the tracking counter; wherein the tracking counter is established after the candidate pedestrian detection box is detected for a first time, and an initial value of the tracking counter is an integer lager than 0.

10. The multi-target pedestrian tracking apparatus according to claim 9, wherein the processor is configured to execute the computer program to:
   in a case that the value of the tracking counter is smaller than a second preset threshold, delete the candidate pedestrian detection box, wherein the second preset threshold is smaller than the first preset threshold.

11. The multi-target pedestrian tracking apparatus according to claim 7, wherein the processor is configured to execute the computer program to:
   for each of the plurality of candidate pedestrian detection boxes in the current frame of image to be detected, calculate partial intersection-over-unions between the candidate pedestrian detection box and other respective candidate pedestrian detection boxes,
   in a case that any one of partial intersection-over-unions is larger than a fourth preset threshold, not store the feature of the candidate pedestrian detection box, and
   in a case that all partial intersection-over-unions are smaller than or equal to the fourth preset threshold, store the feature of the candidate pedestrian detection box as a feature of a tracking box in a current frame of image.

12. The multi-target pedestrian tracking apparatus according to claim 11, wherein the partial intersection-over-union is $$\text{partial\_iou} = \frac{A/B}{A},$$

wherein A is the candidate pedestrian detection box, and B is any one of other candidate pedestrian detection boxes.

13. A non-transitory computer-readable storage medium storing a computer program, wherein the computer program is executed by a processor to:
   detect a plurality of candidate pedestrian detection boxes in a current frame of image to be detected, wherein a temporary tracking identification and a tracking counter are set for each of the plurality of candidate pedestrian detection boxes; and
   determine whether each of the plurality of candidate pedestrian detection boxes matches an existing tracking box, update a value of the tracking counter according to a determination result, and continue to detect a next frame of image to be detected, wherein in a case that the value of the tracking counter reaches a first preset threshold, the updating the value of the tracking counter is stopped, and the temporary tracking identification is converted to a confirmed tracking identification;
   wherein the computer program is executed by the processor to:
   calculate a feature distance between the candidate pedestrian detection box and tracking boxes in previous N frames of images of the current frame of image to be detected,
   in a case that the feature distance is smaller than a third preset threshold, determine that the candidate pedestrian detection box matches the existing tracking box, and
   in a case that the feature distance is larger than or equal to the third preset threshold, determine that the candidate pedestrian detection box does not match the existing tracking box,
   wherein N is an integer larger than 1;
   wherein the computer program is executed by the processor to:
   calculate a feature of the candidate pedestrian detection box;
   calculate a distance dist(n) between the feature of the candidate pedestrian detection box and a feature of a tracking box in a previous $n^{th}$ frame of image of the current frame of image to be detected, wherein n is an integer larger than or equal to 1 and smaller than or equal to N; and
   calculate the feature distance $D_{mean}$ through the following formula:

$$D_{mean} = \frac{1}{N}D, D = \sum_{n=1}^{N} dist(n).$$

14. The non-transitory computer-readable storage medium according to claim 13, wherein the computer program is executed by the processor to:
   in a case that the candidate pedestrian detection box matches the existing tracking box, add 1 to the value of the tracking counter; wherein the tracking counter is established after the candidate pedestrian detection box is detected for a first time, and an initial value of the tracking counter is 0.

15. The non-transitory computer-readable storage medium according to claim 13, wherein the computer program is executed by the processor to:
   in a case that the candidate pedestrian detection box matches the existing tracking box, add 1 to the value of the tracking counter; in a case that the candidate pedestrian detection box does not match the existing tracking box, subtract 1 from the value of the tracking counter; wherein the tracking counter is established after the candidate pedestrian detection box is detected for a first time, and an initial value of the tracking counter is an integer lager than 0.

* * * * *